(12) United States Patent
Schowengerdt et al.

(10) Patent No.: US 10,241,263 B2
(45) Date of Patent: Mar. 26, 2019

(54) ULTRA-HIGH RESOLUTION SCANNING FIBER DISPLAY

(71) Applicant: Magic Leap, Inc., Plantation, FL (US)

(72) Inventors: Brian T. Schowengerdt, Seattle, WA (US); Matthew D. Watson, Bellevue, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/151,029

(22) Filed: Oct. 3, 2018

(65) Prior Publication Data

US 2019/0033517 A1     Jan. 31, 2019

Related U.S. Application Data

(63) Continuation of application No. 14/156,366, filed on Jan. 15, 2014.
(Continued)

(51) Int. Cl.
| | |
|---|---|
| *G02F 1/295* | (2006.01) |
| *G02B 6/06* | (2006.01) |
| *G02B 6/32* | (2006.01) |
| *G02B 6/028* | (2006.01) |
| *G02B 6/02* | (2006.01) |
| *G02B 26/08* | (2006.01) |
| *G02B 6/08* | (2006.01) |

(Continued)

(52) U.S. Cl.
CPC ............... *G02B 6/06* (2013.01); *G02B 6/028* (2013.01); *G02B 6/02042* (2013.01); *G02B 6/08* (2013.01); *G02B 6/32* (2013.01); *G02B 26/08* (2013.01); *G02B 26/10* (2013.01); *G02B 27/0101* (2013.01); *G02F 1/335* (2013.01); *G02B 2027/0123* (2013.01); *G02B 2027/0147* (2013.01)

(58) Field of Classification Search
CPC ............... G02F 1/0134; G02F 2201/30; G02F 2201/307; G02B 6/3604; G02B 6/32; H04B 10/22
See application file for complete search history.

(56) References Cited

U.S. PATENT DOCUMENTS

| | | |
|---|---|---|
| 4,955,687 A | 9/1990 | Pafford |
| 5,033,814 A | 7/1991 | Brown et al. |

(Continued)

FOREIGN PATENT DOCUMENTS

| | | |
|---|---|---|
| EP | 2187259 A1 | 5/2010 |
| JP | 5-504845 A | 7/1993 |

(Continued)

OTHER PUBLICATIONS

Communication Pursuant to Article 94(3) EPC dated Feb. 16, 2018, European Patent Application No. 14741087.2, (9 pages).

(Continued)

*Primary Examiner* — Ellen Kim
(74) *Attorney, Agent, or Firm* — David C. Lundmark

(57) ABSTRACT

One embodiment is directed to a compact system for scanning electromagnetic imaging radiation, comprising a first waveguide and a second waveguide, each of which is operatively coupled to at least one electromagnetic radiation source and configured such that output from the first and second waveguides is luminance modulated and scanned along one or more axes to form at least a portion of an image.

5 Claims, 12 Drawing Sheets

Related U.S. Application Data

(60) Provisional application No. 61/752,972, filed on Jan. 15, 2013.

(51) Int. Cl.
   *G02B 26/10* (2006.01)
   *G02F 1/335* (2006.01)
   *G02B 27/01* (2006.01)

(56) References Cited

U.S. PATENT DOCUMENTS

| | | | |
|---|---|---|---|
| 5,546,492 | A | 8/1996 | Ansley et al. |
| 5,802,222 | A | 9/1998 | Rasch et al. |
| 6,362,912 | B1 | 3/2002 | Lewis et al. |
| 6,539,151 | B2 | 3/2003 | Fajardo et al. |
| 6,917,740 | B2 | 7/2005 | Boek et al. |
| 7,154,515 | B2 * | 12/2006 | Donahue ................ G06K 15/12 345/686 |
| 7,298,938 | B2 | 11/2007 | Johnston |
| 7,312,879 | B2 | 12/2007 | Johnston |
| 7,366,389 | B2 | 4/2008 | Iwaskai |
| 7,822,314 | B1 | 10/2010 | Robin et al. |
| 8,288,157 | B2 * | 10/2012 | Duer ................ G01N 21/648 422/82.11 |
| 8,372,004 | B2 | 2/2013 | Krattiger |
| 8,469,525 | B2 | 6/2013 | Kojima et al. |
| 8,503,847 | B2 | 8/2013 | Kokubun et al. |
| 8,757,812 | B2 | 6/2014 | Melville et al. |
| 9,014,517 | B2 | 4/2015 | Katakura et al. |
| 2002/0110077 | A1 | 8/2002 | Drobot et al. |
| 2003/0103199 | A1 | 6/2003 | Jung et al. |
| 2004/0151466 | A1 | 8/2004 | Crossman-Bosworth et al. |
| 2004/0179764 | A1 | 9/2004 | Melikechi et al. |
| 2006/0171647 | A1 | 8/2006 | Ye et al. |
| 2007/0154153 | A1 | 7/2007 | Fomitchov et al. |
| 2009/0046298 | A1 * | 2/2009 | Betzig ................ G01N 21/6445 356/521 |
| 2009/0218641 | A1 | 9/2009 | Melville et al. |
| 2009/0273540 | A1 | 11/2009 | Schultz |
| 2010/0220293 | A1 | 9/2010 | Mizushima et al. |
| 2011/0032602 | A1 | 2/2011 | Rothenberg |
| 2011/0034768 | A1 | 2/2011 | Ozaki et al. |
| 2011/0274435 | A1 | 11/2011 | Fini et al. |
| 2013/0105666 | A1 | 5/2013 | Saitou et al. |
| 2013/0163072 | A1 | 6/2013 | Chang et al. |
| 2014/0050235 | A1 | 2/2014 | Clowes et al. |
| 2014/0078510 | A1 * | 3/2014 | Rubio Guivernau ................ G01B 9/02091 356/479 |
| 2014/0118555 | A1 * | 5/2014 | Hegg ................ G01N 21/474 348/169 |
| 2014/0178023 | A1 | 6/2014 | Oh et al. |

FOREIGN PATENT DOCUMENTS

| | | |
|---|---|---|
| JP | 2002-514321 A | 5/2002 |
| JP | 2004-532425 A | 10/2004 |
| JP | 2006-108781 A | 4/2006 |
| JP | 2006-330583 | 12/2006 |
| JP | 2007-517263 A | 6/2007 |
| WO | 91/07675 A1 | 5/1991 |
| WO | 98/49927 | 11/1998 |
| WO | 2002/077697 A2 | 10/2002 |
| WO | 2005/067314 A1 | 7/2005 |
| WO | 2009/034694 A1 | 3/2009 |
| WO | 2013/123461 A1 | 8/2013 |

OTHER PUBLICATIONS

Extended European Search Report dated Aug. 4, 2016, European Patent Application No. 14741087.2, (11 pages).
Final Office Action dated Apr. 1, 2016, U.S. Appl. No. 14/156,366, (23 pages).
Final Office Action dated Aug. 16, 2017, U.S. Appl. No. 14/156,366, (22 pages).
First Examination Report dated Mar. 19, 2018, New Zealand Patent Application No. 710096, (4 pages).
First Examination Report dated Mar. 17, 2017, Australian Patent Application No. 2014207545, (3 pages).
First Office Action dated Oct. 10, 2017 with English Translation, Chinese Patent Application No. 201480014814.9, (18 pages).
International Search Report and Written Opinion dated May 8, 2014, International Application No. PCT/US14/11736, International Filing Date of Jan. 15, 2014., (11 pages).
Japanese Office Action—Notice of Reasons for Rejection dated Nov. 27, 2017 (with English translation), Japanese Patent Application No. 2015-553811, (13 pages).
Non Final Office Action dated Apr. 6, 2017, U.S. Appl. No. 14/156,366, (21 pages).
Non Final Office Action dated Dec. 29, 2017, U.S. Appl. No. 14/156,366, (21 pages).
Non Final Office Action dated Nov. 4, 2016, U.S. Appl. No. 14/156,366, (15 pages).
Non Final Office Action dated Sep. 3, 2015, U.S. Appl. No. 14/156,366, (26 pages).

* cited by examiner

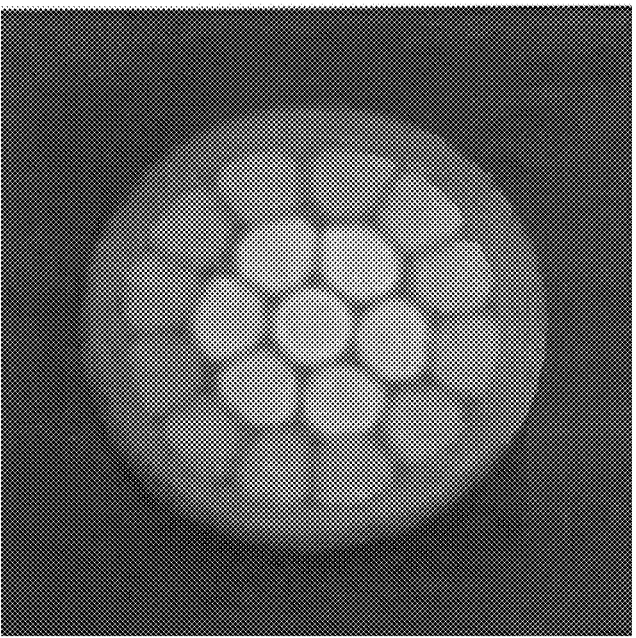
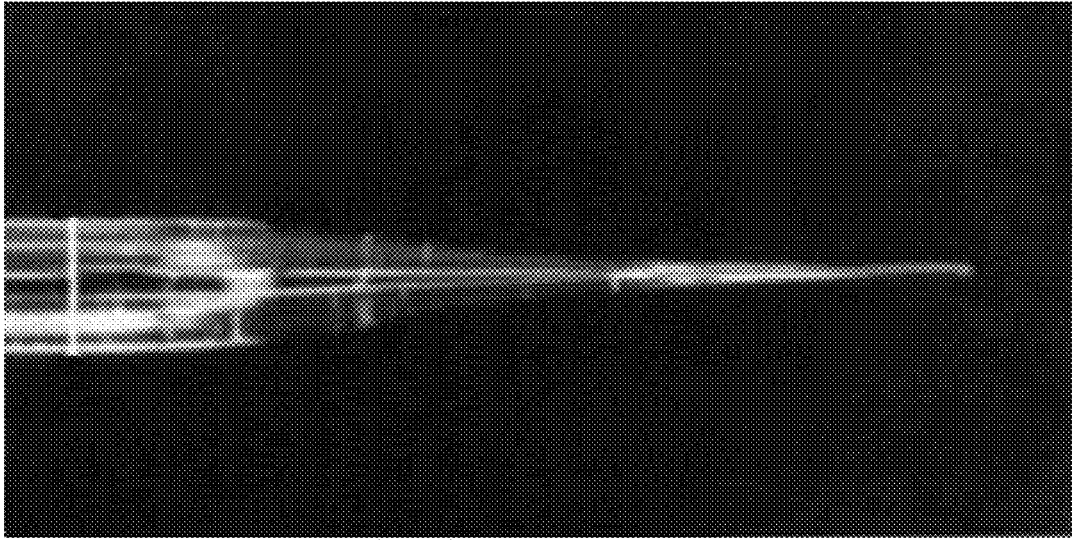
FIG. 7A
FIG. 7B

ULTRA-HIGH RESOLUTION SCANNING FIBER DISPLAY

RELATED APPLICATION DATA

The present application is a continuation of U.S. patent application Ser. No. 14/156,366, filed on Jan. 15, 2014, which claims the benefit under 35 U.S.C. § 119 to U.S. Provisional Application Ser. No. 61/752,972 filed Jan. 15, 2013. The foregoing applications are hereby incorporated by reference into the present application in their entirety.

The invention described herein may be manufactured and used by or for the United States Government for United States Government purposes without payment of royalties thereon or therefore.

FIELD OF THE INVENTION

The present invention relates generally to compact imaging systems for use in capturing and/or projecting images, and more particularly to configurations involving image processing via a plurality of fiber cores.

BACKGROUND

For the military, as well as civilian, pilot, situational awareness is of primary importance. For example, Controlled Flight Into Terrain (CFIT) incidents result from a lack of information concerning an impending catastrophic collision with the environment. The through-the-cockpit view of the pilot may be impeded by visibility conditions (dark of night, inclement weather), or because of a need to intentionally obscure the view via curtains or electronic darkening of the canopy to protect against directed energy threats.

Information concerning the status of aircraft systems, flight path, altitude, air speed, attitude, and numerous other flight parameters are also critical to total situational awareness. Additionally, there is a wealth of data now available to the pilot via off-board or on-board databases, as in the Real Time Information In the Cockpit (RTIC) concept, including but not limited to weather info, location of hostile forces, air-to-air and surface-to-air threats, mission information, and terrain detail. Another source of information comes from high-resolution on-board sensors, e.g. Forward Looking Infrared (FLIR) and night vision sensors. This tremendous influx of available data may be presented to the crew either through Head Down Displays (HDDs), Head Up Displays (HUDs), or some combination of both. HDDs have the obvious disadvantage that the pilot's head is down, rather than engaged and focused on the scene out the cockpit. HUDs are disadvantaged in that the information is only viewable through the eyebox which is typically fixed on the aircraft's bore sight.

Head Mounted Displays (HMDs), which optically relay the output from one or more helmet-mounted microdisplays to display images within the pilot's field-of-view (FOV), allow the pilot to remain focused outside the cockpit, while presenting pertinent situational data as visual cues or symbology overlaid on top of the visual scene, or even as fully artificial rendering of the terrain and scene outside of the cockpit in the case of impaired visibility. Because the display system moves with the pilots head, he/she can keep the displayed information within their field of view (FOV) at all times.

To fully utilize the extensive capabilities of the human visual system, an HMD should provide a large horizontal and vertical FOV, high spatial resolution, and a large color depth. In addition, luminance is very important, as a see-through display must be bright enough to be able to clearly display information against a high-glare background. Aircraft airspeeds, nearby fast moving objects and information, and rapid head movements by the pilot mean that a high frame rate is necessary as well.

The FOV of the HMD may be determined by the microdisplay image size together with the viewing optics. The human visual system has a total FOV of about 200° horizontal by 130° horizontal, but most HMDs provide on the order of 40° FOV. For synthetic vision applications, where a plethora of operational data is available, a much larger field of view approaching that of human visual capabilities will enable the presence of peripheral visual cues that reduce head-scanning by the pilot and increases their sense of self-stabilization. An angular resolution of about 50-60 arc-seconds is a threshold for 20/20 visual acuity performance, and it is determined by the pixel density of the microdisplay. To best match the capabilities of the average human visual system, an HMD should provide 20/20 visual acuity over a 40° by 40° FOV, so at an angular resolution of 50 arc-seconds this equates to about 8 megapixels (Mpx). To increase this to a desired 120° by 80° FOV would require nearly 50 Mpx.

Because there are several HMD systems in service today, many of which are standardized around a 12 mm diagonal image source with relay and viewing optics designed for this display size, it is useful to fit new display technologies within this envelope and be essentially swappable with the microdisplays already in place in order to be of the greatest utility.

In order to fit 8 Mpx in this 12 mm format, the pixel size may be 3 microns or smaller. Current state of the art in HMD microdisplay technology does not offer sufficient resolution and FOV at the high frame rates needed to provide the minimum desired (20/20 acuity) visual requirements for future pilot HMDs. The pixel density of currently deployed image sources, such as AMOLED, AM-LCD, and LCOS is constrained by the minimum achievable pixel size. For each of these technologies, color display requires 3 side-by-side elements, further constraining effective pixel pitch and resultant angular resolution, so new enabling technologies must be pursued.

There is a need for improved compact imaging systems which may be utilized in various applications such as HMD applications. Various embodiments are presented herein to address this challenge.

SUMMARY

One embodiment is directed to a compact system for scanning electromagnetic imaging radiation, comprising a first waveguide and a second waveguide, each of which is operatively coupled to at least one electromagnetic radiation source and configured such that output from the first and second waveguides is luminance modulated and scanned along one or more axes to form at least a portion of an image. At least of the one of the first or second waveguides may comprise an optical fiber. The optical fiber may comprise a cladding and at least one core. The optical fiber may comprise two or more cores occupying the same cladding. The optical fiber may be a single-mode optical fiber. The optical fiber may be a multi-mode optical fiber. The optical fiber may be a step-index optical fiber. The optical fiber may be a graded-index optical fiber. The optical fiber may be a photonic crystal optical fiber. The least one electromagnetic radiation source may be configured to produce electromagnetic radiation having a wavelength in the ultraviolet to infrared range. The at least one electromagnetic radiation source may be configured to produce visible light electromagnetic radiation. Both the first and second waveguides may be co-located within the same host medium. The first and second waveguides may be co-located within separate host mediums. The system further may comprise a scanning actuator operatively coupled to at least one of the first and second waveguides and configured to physically displace said at least one of the first and second waveguides. The scanning actuator may comprise a piezoelectric actuation element. The scanning actuator may be coupled to both of the first and second waveguides and configured to physically displace them together. A first scanning actuator may be coupled to the first waveguide, and a second scanning actuator may be coupled to the second waveguide, such that the first and second waveguides may be actuated independently. The system further may comprise a first scanning actuator operatively coupled to and configured to physically displace the first waveguide along with at least one other intercoupled waveguide, and a second scanning actuator operatively coupled to and configured to physically displace the second waveguide along with at least one other intercoupled waveguide. The first waveguide and at least one other intercoupled waveguide may comprise a single multicore fiber. The output from the first and second waveguides may be passed to a scanning element configured to scan said output along the one or more axes. The scanning element may be selected from the group consisting of: a MEMS mirror scanner, a deformable membrane mirror, a scanning prism, and a scanning lens. The at least one electromagnetic radiation source may comprise two independent electromagnetic radiation sources, a first electromagnetic radiation source operatively coupled to the first waveguide, and a second electromagnetic radiation source operatively coupled to the second waveguide. The at least one electromagnetic radiation source may comprise a composite source configured to inject a plurality of wavelengths of radiation into at least one of the first or second waveguides. The composite source may be configured to inject red, green, and blue visible light radiation wavelengths. The composite source may comprise a plurality of individual sources operatively coupled together with a combiner. The combiner may comprise a wavelength division multiplexer. The at least one electromagnetic radiation source may comprise a directly-modulatable emitter. The directly-modulatable emitter may comprise a diode laser. The directly-modulatable emitter may comprise a light-emitting diode. The at least one electromagnetic radiation source may comprise an emitter operatively coupled to a modulator. The modulator may comprise an interferometric modulator. The modulator may comprise a Mach-Zehnder interferometric modulator. The modulator may comprise an acousto-optical modulator. The modulator may comprise a shutter. The output from the first and second waveguides may be scanned in a spiral scan pattern. The image at an image plane may have a diameter that is larger than a combined cross sectional geometric measurement of the first and second waveguides. The system further may comprise a plurality of additional waveguides, the first, second, and plurality of additional waveguides being arranged in a hexagonally-packed array configuration. Image field areas associated with the outputs of each of the first, second, and plurality of additional waveguides may be overlapped by a minimum amount determined by a common intersection of three equal circles. In a configuration featuring more than one core (i.e., a socalled "multicore" configuration), the cores may be arranged in a hexagonally-packed array configuration. The system further may comprise first and second lenses coupled to the first and second waveguides such that imaging radiation transmitted through the first and second waveguides is passed through the first and second lenses before being output to form the portion of the image. The first and second lenses may comprise gradient index lenses. The first and second lenses may comprise refractive lenses.

BRIEF DESCRIPTION OF THE DRAWINGS

FIGS. 7A and 7B illustrate conventional multicore fiber configurations.

DETAILED DESCRIPTION

Figure 1:
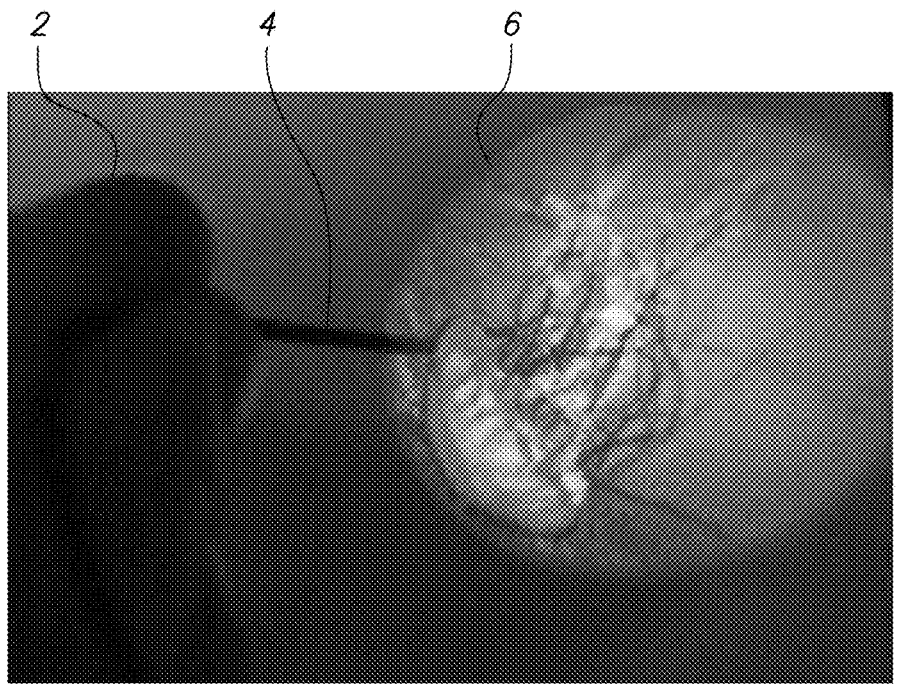
FIG. 1 illustrates a fiber scanning display being supported by a hand of an operator.

In order to address the abovedescribed challenge, two general configurations for producing a color, ultra-high definition micro-display (CUDM) using a Fiber Scanned Display (FSD) technology, such as those described in U.S. Pat. Nos. 6,046,720; 7,555,333; 7,784,697; and U.S. patent application Ser. Nos. 11/573,118 and 12/468,832, are presented herein. Each of these five references is incorporated by reference herein in its entirety. These two general configurations are characterized by their ability to satisfy the minimum desired requirements for the CUDM, the cost and complexity of implementation, and for their ability to meet or exceed the maximum desired requirements. FIG. 1 illustrates an FSD configuration (4) being held by the hand (2) of an operator while an image (6) is projected upon a nearby surface.

Figure 2:
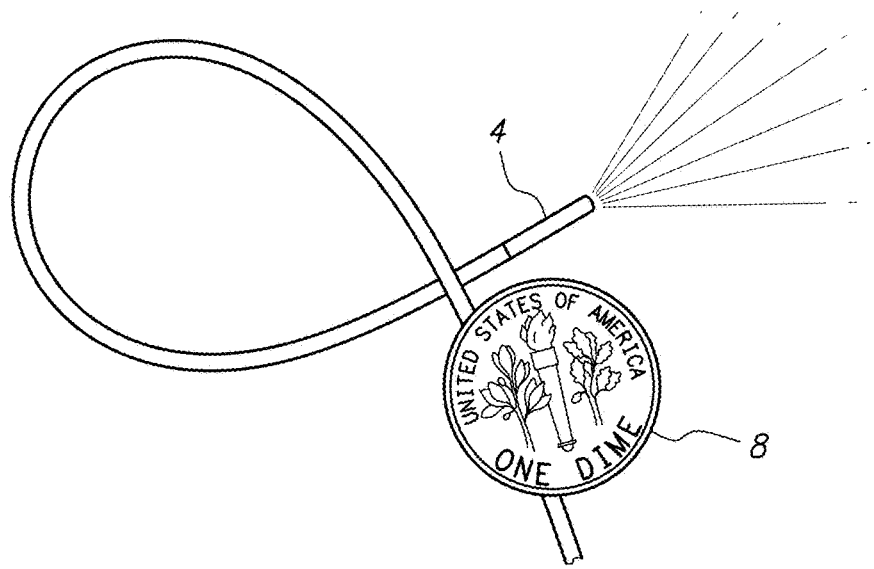
FIG. 2 illustrates a fiber scanning display relative to a coin to demonstrate size of a particular embodiment.
Figure 3:
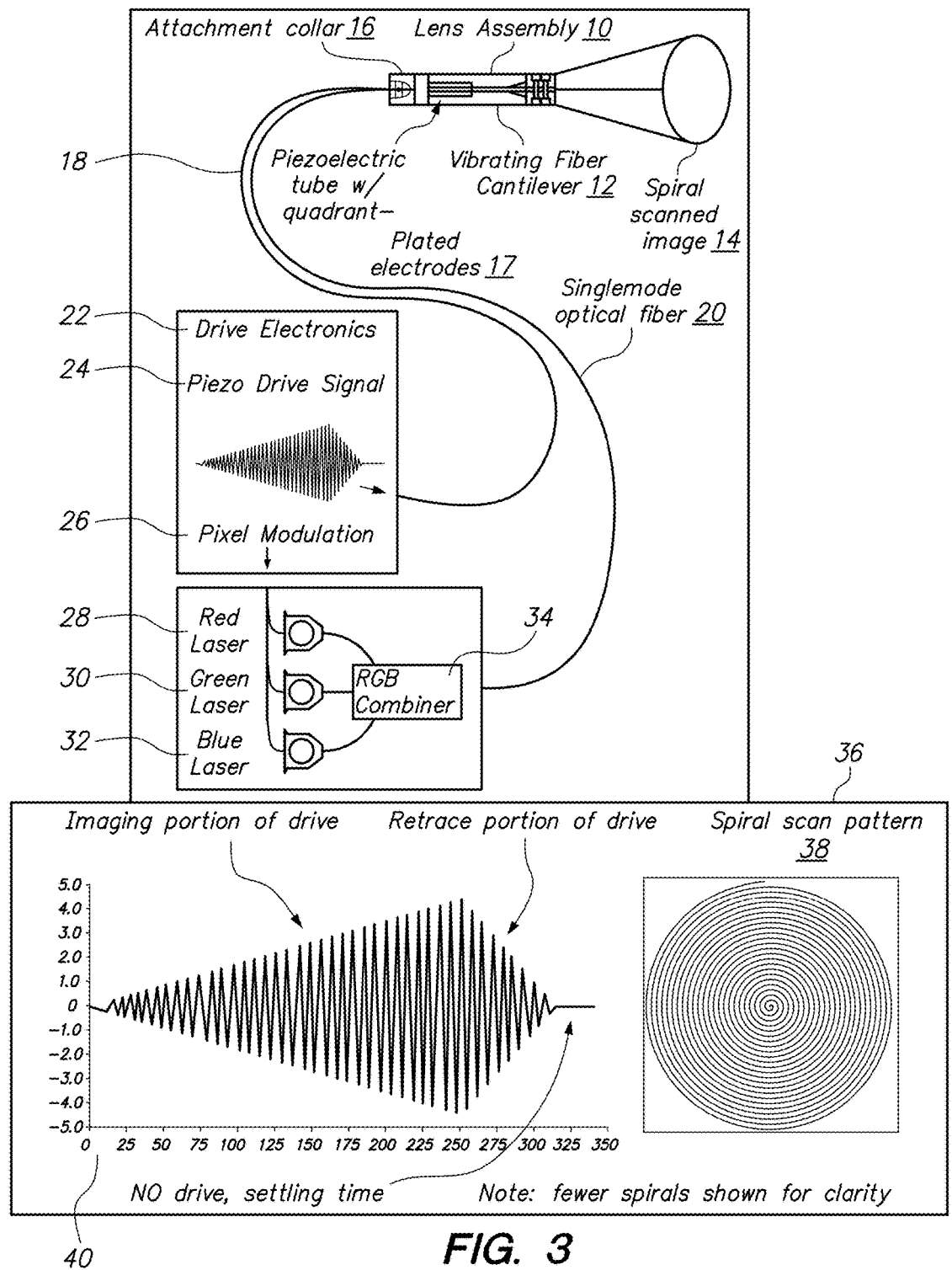
FIG. 3 illustrates one embodiment of a system configuration in accordance with the present invention.

As described in the aforementioned references, in one embodiment, a FSD operates by vibrating the tip of an optical fiber using a piezoelectric actuator while modulating the intensity of the light transmitted down its core to form an image. Because the singlemode core retains the coherence of the transmitted light it acts as a point source and can be imaged to a diffraction-limited spot, the size of which is determined by the scan lens. By imaging the scan to a plane just in front of the scan lens, a spot size smaller than 3 microns can be generated. One embodiment of the FSD is capable of displaying an effective 500×500 lines of resolution (in actuality a tight spiral of 250 cycles producing a circular display area, such as in the embodiment of FIG. 1, element 6). Pixel spacing along this spiral is a function of the pixel modulation rate, and is 20 MHz under typical operating conditions of one embodiment. With a mechanical scan frequency of 11.5 kHz, this results in a frame rate of 30 Hz, with about 2000 pixels per spiral cycle of the scan if the pixel modulation is kept constant, producing about 250,000 pixels. Scan rates as high as 24 kHz have been achieved in the lab, which would allow the same resolution to be produced at about a 60 Hz frame rate. A 72 Hz frame rate can be achieved by driving the fiber at about 28 kHz. The frame rate, resolution, and scan angle are dynamically adjustable by increasing or decreasing the scan frequency and scan amplitude, with frame rates between 15 Hz and 60 Hz typically achieved at varying resolutions, and scan angles as high as 120°. The FSD's extremely small size (such as in the range of 1 mm diameter×7 mm long, as shown in the embodiment of FIG. 2, wherein an FSD 4 is shown relative to the size of a U.S. 10 cent coin 8) lends itself well in applications where size and weight are a concern, and because the drive electronics, light sources, and power can all be located remotely from the scanner head itself, it is particularly well suited for use in HMDs. A system configuration is illustrated in FIG. 3, along with an associated piezo drive signal plot and spiral scan pattern diagram. Referring to FIG. 3, an exemplary embodiment of an FSD is illustrated. Radiation sources, such as a red laser 28, green laser 30, and blue laser 32 are combined into a single waveguide (e.g., RGB combiner 34). The waveguide, such as singlemode optical fiber 20, relays light to the tip of the waveguide (e.g., a cantilevered fiber tip 12), where it is emitted and passes through optional lens assembly 10, which preferably brings the emitted light to focus at an image plane (e.g., a spiral scanned image 14). The waveguide tip 12 is scanned along one or more axes by an actuator, such as a piezoelectric tube actuator 17, such that the light emitted at the tip of the waveguide is preferably scanned in an area filling scan pattern at an image plane, such as a spiral scanned image 14. Actuator 17 may be affixed to an enclosure with an attachment collar 16. A drive electronics system 22 may generate a drive signal 24 for a piezoelectric actuator 17, to control the actuation of said actuator 17. The drive electronics 22 may also generate a pixel modulation signal 26 to modulate the luminance of the radiation sources 28, 30, and 32, such that pixels are formed at the image plane 14. In one embodiment, the actuator drive signal 24 is modulated in accordance with the exemplary pattern shown in orthogonal (x) axis plot 40, such that the signal constitutes a sinusoidal drive signal that is amplitude modulated over time. In one embodiment, the drive signal 24 comprises a sinusoidal signal portion that drives one scan axis of actuator 17, as well as a second sinusoidal signal portion that drives a second scan axis, with the second sinusoidal drive signal being phase-shifted relative to the first drive signal portion such that the waveguide tip 12 sweeps through a circular scan pattern. In one embodiment, a sinusoidal drive signal 24 is amplitude modulated over time to dilate and contract this circular scan pattern to form an area-filling spiral scan pattern 38.

Figure 4:
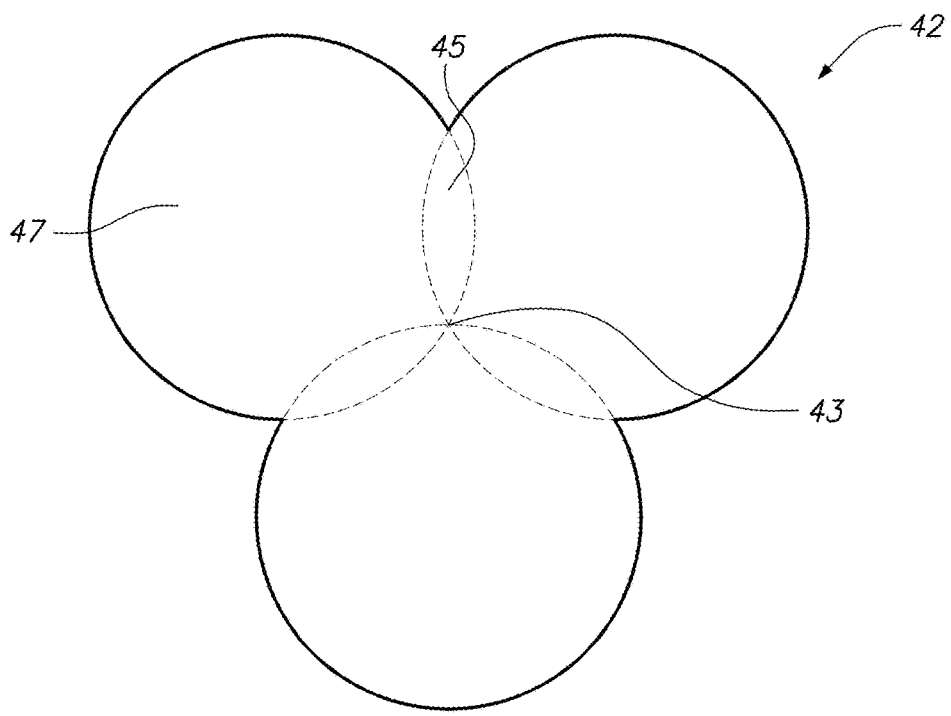
FIG. 4 illustrates an overlapping configuration.
Figure 5:
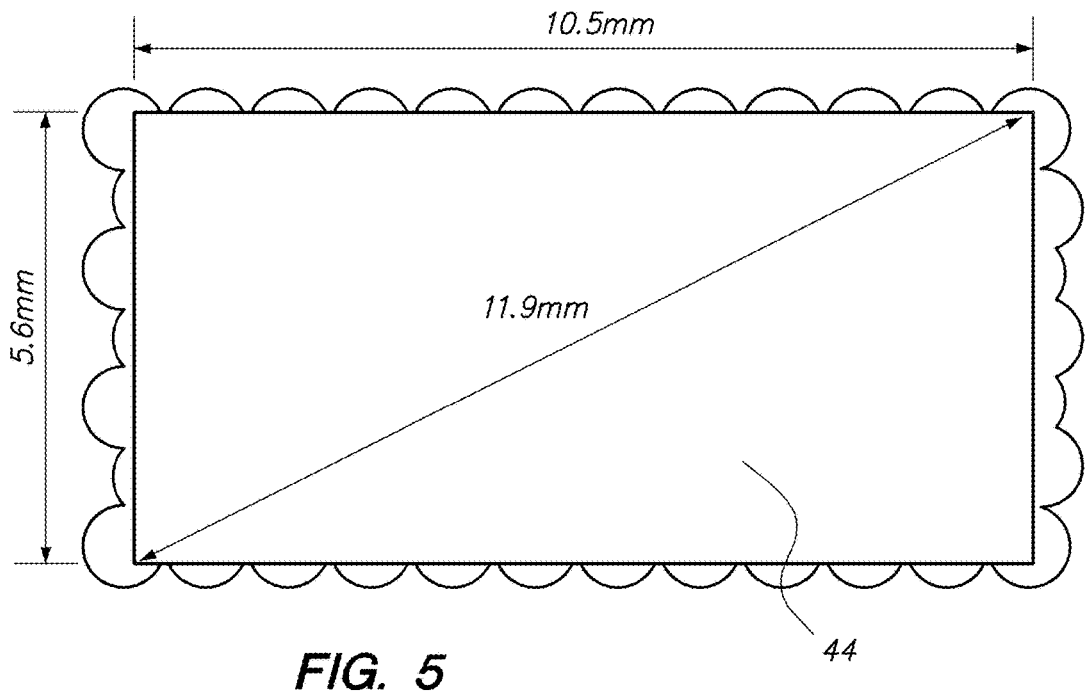
FIG. 5 illustrates a projected display area in accordance with one embodiment.

To produce a larger display with greater total lines of resolution, while maintaining frame rate and pixel density, multiple FSDs may be assembled into a two-dimensional array. If the focusing optics are such that the projected field area is slightly larger than the physical diameter of the projector, or about 1.2 mm in diameter at the focal distance of the optics (e.g., for a FSD module diameter of approximately 1 mm), these field areas can be overlapped a minimum amount determined by the common intersection of three equal circles (as shown, for example, in FIG. 4, element 42; the common intersection of the circles is at element 43; element 45 illustrates an overlapping region; element 47 illustrates a nonoverlapping region), thus producing a fully filled rectangular display area. The array may then be scaled to any vertical and horizontal dimension desired. To achieve a desired 8 Mpx display in a 12 mm diagonal format (at least 3840×2048 lines of resolution), we can create, e.g., an 11×7 hexagonal lattice of tiled FSDs, producing an approximately 4375×2300 line (or 10Mpx) display; a suitable projected display area (44) embodiment is depicted in FIG. 5.

Figure 6A:
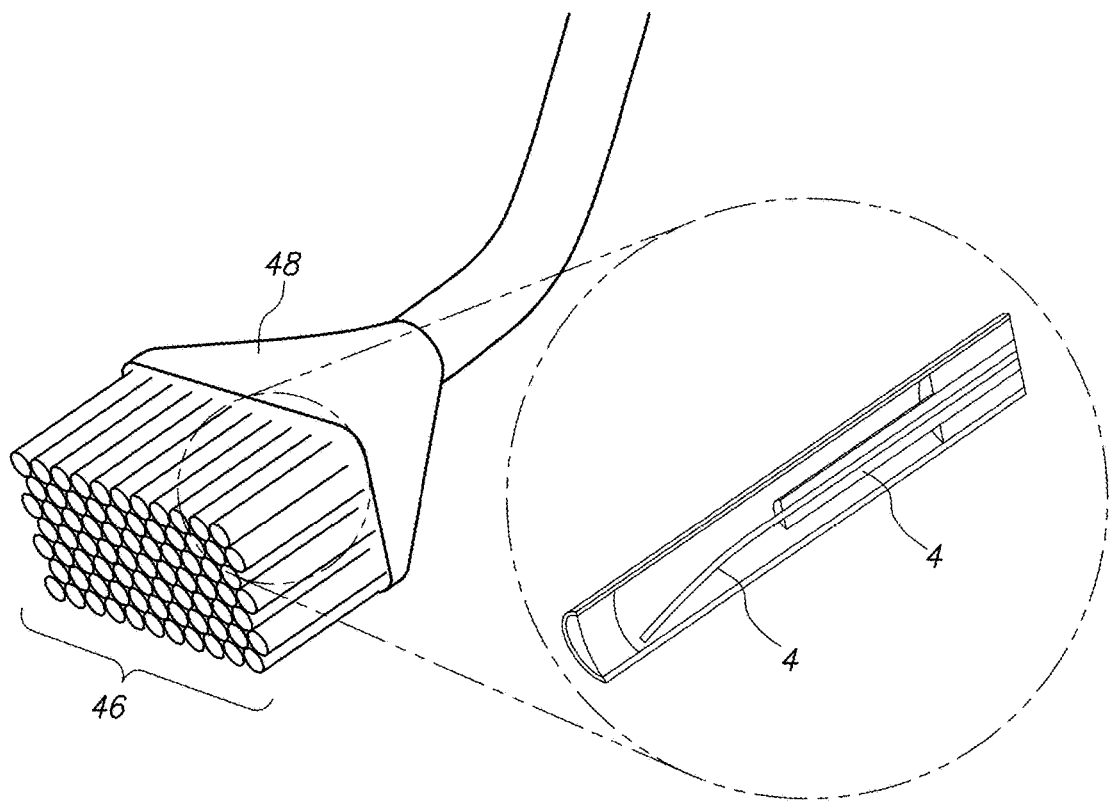
FIGS. 6A and 6B illustrate a configuration wherein multiple fiber scanning displays are coupled together in an array or matrix.
Figure 6B:
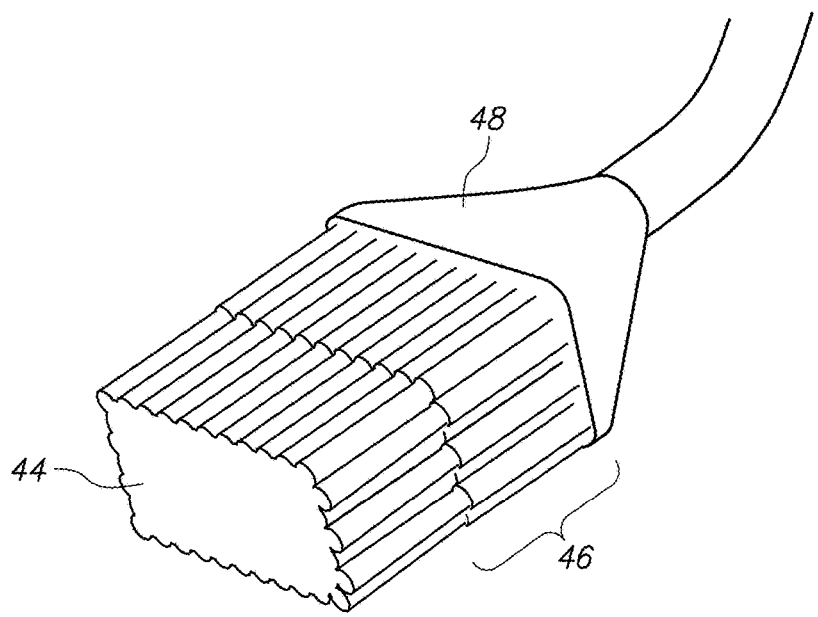

Tiling in this way produces more lines of resolution than are natively available in an individual display. An advantage to tiling slightly magnified images projected with FSDs is that no additional optical blending is required to conceal the boundary of the display hardware. FIG. 6A illustrates an exemplary tiled display configuration wherein an array of 11×7 FSDs (46) are coupled to the same housing or platform (48) such that they may be moved in unison if such movement is desired in a particular embodiment; in other embodiments, individual actuation, such as by an FSD mechanism as shown (4), may be utilized to uniquely and independently actuate each of the FSDs. FIG. 6B illustrates a projected display area (44) at a particular image plane that may result from such a configuration wherein a matrix of FSDs are utilized together from a common platform or coupling (48).

To produce a seamless image that appears to the viewer as a single, high-resolution, monolithic display, there are several important challenges, including geometric registration, and photometric seamlessness.

Geometric registration refers to the physical alignment of each projector module with its neighbors. For the scans to overlap in a predictable way, each FSD should be precisely located with respect to adjacent FSDs. For standard tabletop or ceiling mounted projectors this can prove to be a complicated and difficult process, but for the FSDs it is a relatively simple matter of high-quality, precision machining of the individual scanner housings and the main assembly housing.

Several factors contribute to the uniformity of the image as perceived by the viewer. Intra-projector luminance and chrominance refers to the variation of brightness and color within an individual projector, but because the FSD scans only a single pixel using single light sources for each color channel, luminance and chrominance should be entirely uniform for each projector.

Inter-projector luminance and chrominance refers to the variation between individual projectors. Chrominance variations are typically small, but luminance differences can be significant between projectors. For the FSDs, the intensity of the output from the laser diodes may be adjusted to bring the projectors into agreement with one another.

Because the FSDs scan a single pixel, the neighboring scanners' pixels do not physically overlap. However, perceptually, the luminance in these regions may nearly double because the human visual system cannot temporally distinguish between the projected spots. Methods of equalizing the brightness between tiled conventional projectors may be employed to equalize brightness in these overlapped scanned regions.

A few technology providers, such as Corning and Nufern, offer single mode, visible wavelength optical fibers with core sizes as small 2.1-3.5 microns. However, even with a core size of 2.5 microns, the Gaussian mode field diameter is about 3.5 microns. The design of high quality focusing optics of the FSDs is useful to achieve a diffraction limited spot size for the scanned pixel that falls under a 3 micron pixel size required to achieve a desired resolution of the display.

Additionally, each FSD produces a curved scan field at the fiber tip, and the optical design should be optimized to sufficiently flatten this field while minimizing distortion and other aberrations.

In this tiled approach, the overall scan angle has been reduced to minimize overlap, maximize pixel density, and minimize the overall extent of the display. However, this results optically in a narrower eyebox (the term "eyebox" representing the volume through which an operator can move their eye and still visualize the image; generally it is desirable to have a large eyebox) at the viewer's end. To overcome this, in one embodiment the use of a lens, e.g., a graded-index rod lenses ("GRIN" lenses), to produce a larger numerical aperture (NA) at the output of the tip of the scanning fiber display may be employed (FIG. 16B).

Providers such as Asahi-Kasei and Mitsubishi of Japan offer multi-core optical fibers or fused-tapered multi-core fibers. Because these materials would facilitate the possibility of scanning multiple pixels at once (as opposed to the single pixel presently scanned), the total resolution of at the image plane can be increased for a given scan frequency, and the effective frame rate may be increased while maintaining or even increasing the spatial resolution of the display. FIGS. 7A and 7B illustrate embodiments of available multi-core optical fiber configurations (FIG. 7A illustrates a cross-sectional view 50 of a multi-core configuration; FIG. 7B illustrates a side view 52 of a tapered multi-core configuration).

The abovedescribed technologies facilitate an ultra-high resolution display that supports a large FOV in a head-mounted or other near-to-eye display configuration.

With regard to tiling, the images produced by the fiber-scanned display modules can be seamlessly tiled to form a continuous composite image. When the scanned images from each individual FSD in the tiled array images are partially overlapped, the intersection of the scan fields will result in regions of increased luminance, i.e., the composite image will contain luminance non-uniformities. To provide greater luminance uniformity in the composite image, a number of methods may be employed, including blanking overlapping pixels and/or modulating the luminance level of the FSDs in these regions (e.g., reducing the luminance of each scanner at a given pixel by 50%, when two scanners are addressing the same image area, so the luminance sums to 100% of the desired luminance level).

In a multiple FSD configuration, the multiple FSDs preferably are positioned in a tiled array using precision fabrication techniques. For seamless integration, the separation distance between the fiber centerlines is tightly controlled, as is the orientation of the actuation axes on the piezoelectric actuator tubes.

Very small variations within the mechanical tolerances of the optical fiber (diameter, core/cladding concentricity, core size, circularity of the fiber cross-section) may result in variations in the mechanical behavior between fiber scanners. In a preferred embodiment, the drive signal to each actuator is customized to compensate for such mechanical variations between optical fibers in the array.

In one embodiment, the FSDs in an array may be synchronized to reduce any perceivable temporal or spatio-temporal artifacts such as flicker or image tearing for moving images.

With regard to scan optics, the preferred embodiments of the FSD produce a curved scan field at the tip of fiber, so the optical system that relays the image to the eye preferably performs a field-flattening function (by, e.g., the inclusion of a negative lens in the optical train), in addition to magnification. The fiber optics and subsequent scan optics also preferably maximize the object-side numerical aperture (NA) to support a large eye box to a viewer. Increasing the NA also reduces the spot size at the image plane, enabling more pixels to be densely packed within a small region of the image plane. Standard fiber can provide a starting mode field diameter of 3-4 microns for visible light. By adding a lens to the tip of the fiber (e.g., a conventional curved lens or a graded-index GRIN lens) as illustrated in FIG. 16B, the NA from the fiber is increased (and thereby the spot size or "mode field diameter at the tip is reduced). By adding a strong lens at the tip, a mode field diameter of 0.6 microns can be provided near the tip of the fiber. In comparison, alternative display technologies such as liquid crystal on silicon and LED are currently limited to a pixel pitch of about 4-5 microns. GRIN lenses can be fabricated separately and fused directly to the fiber tip.

In one embodiment employing multi-core fiber, the multiple cores may be scanned to produce a well-filled image plane the image quality of which is not degraded by noticeable gaps in the image. The quantity of, and spacing between, fiber cores interacts with the density of the scan pattern. A larger number of cores can be scanned in a sparser scan pattern (i.e., a large distance between scan lines) while maintaining a well-filled image. Conversely, a smaller number of cores is preferably scanned with a denser scan pattern (i.e., a smaller distance between scan lines) to provide a well-filled image. In one embodiment, the cores of the multi-core fiber are tiled in a hexagonal packing, providing the advantage of minimizing the distance between a large number of cores (e.g., FIGS. 7A, 15A, and 15B).

In two waveguides that are very close together, for instance adjacent cores in multi-core optical fiber, light transmitted through one core can partially cross-couple to the adjacent mode through an evanescent mode. Such evanescent mode behavior can generate crosstalk between the image content being carried by adjacent cores, if they are positioned very close together. In a preferred embodiment, the cores are separated by a minimum distance to minimize crosstalk between fiber cores to a level not easily detectable by a human observer, to maintain high image quality. Alternatively or additionally, opaque material can be incorporated into the cladding between fiber cores, to reduce crosstalk for more closely spaced fibers.

It is important to emphasize that though the foregoing describes two approaches in relative isolation, an array of multiple scanned fibers and a single scanned multi-core fiber (containing an array of fiber cores), these approaches represent points on a design continuum. In another preferred embodiment, the approaches are combined, with an array of multiple multi-core fibers being scanned to form a composite high-resolution image (e.g., FIG. 13). By collecting sets of cores together within multi-core fibers, the number of moving parts can be minimized and manufacturing complexity can be reduced.

In one embodiment, the image relay in the HMD or other wearable display is a transparent element, superimposing imagery over the direct view of the real world. Compatible HMD viewing optics include, but are not limited to, refractive systems, reflective, diffractive, substrate guided optics.

The technologies described herein facilitate high resolution, lightweight and unobtrusive HMDs and enable virtual and augmented reality visual systems for everything from gaming and personal entertainment systems to workspace collaboration and real world navigation and information systems and high performance avionics displays. Preferably, an HMD should be comfortable, attractive, and virtually indistinguishable from normal eyewear.

Figure 8:
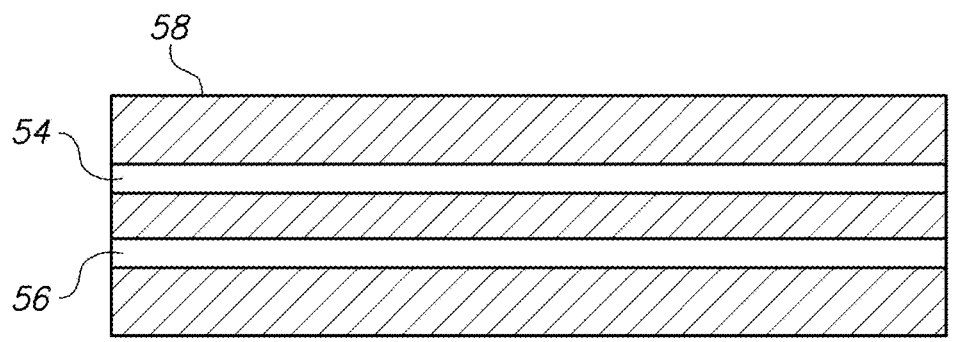
FIG. 8 illustrates an embodiment wherein two waveguides are collocated within one host medium.
Figure 9:
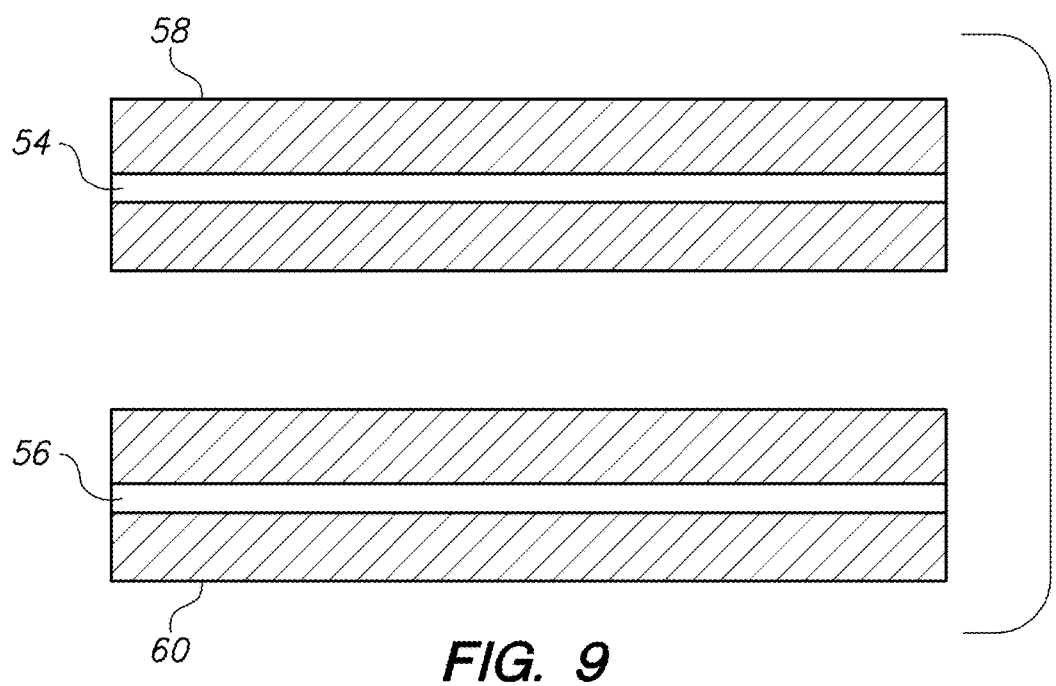
FIG. 9 illustrates an embodiment wherein two waveguides are collocated within two host mediums.
Figure 10:
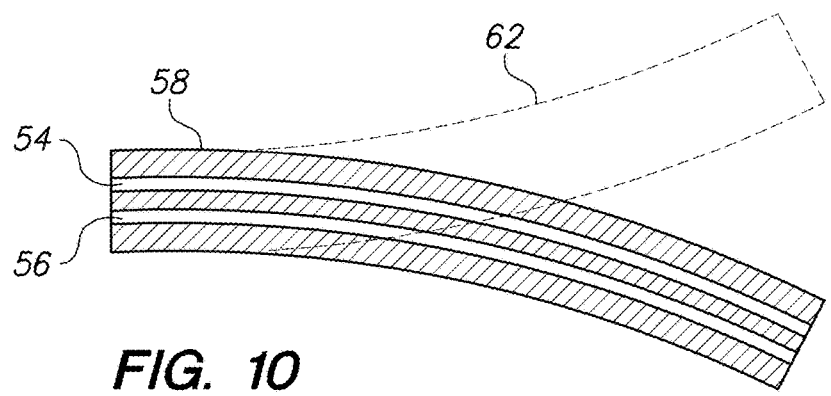
FIG. 10 illustrates movement of a configuration such as that illustrated in FIG. 8.
Figure 11:
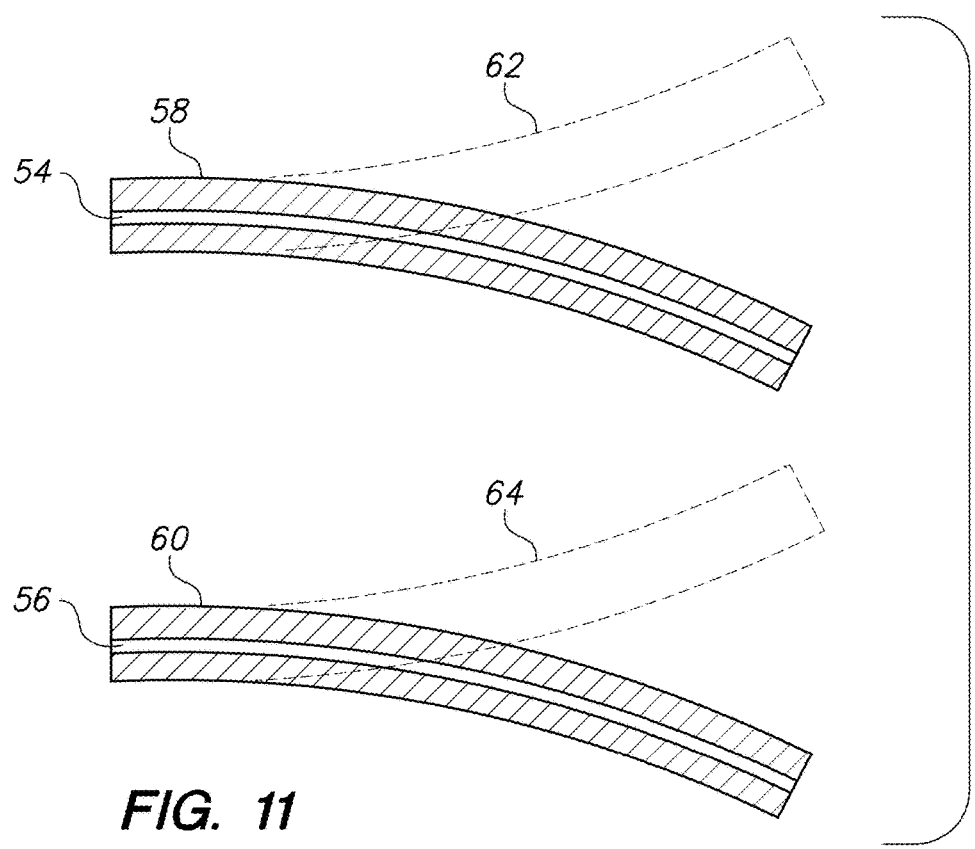
FIG. 11 illustrates movement of a configuration featuring two host medium/waveguide configurations similar to those depicted in FIG. 9, wherein the two host mediums are intercoupled to move together.
Figure 12:
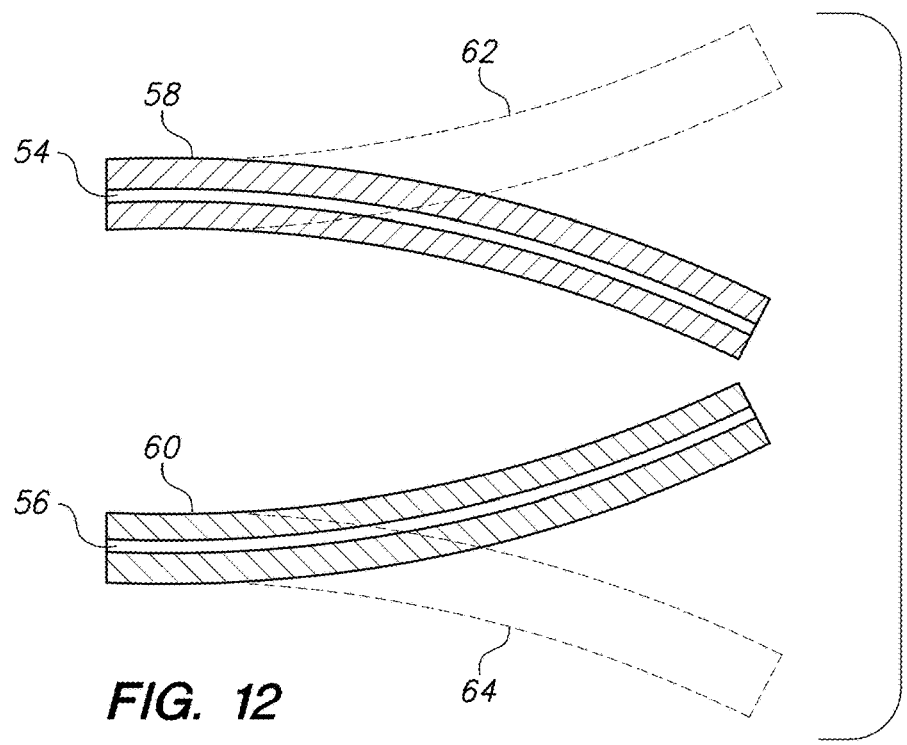
FIG. 12 illustrates movement of a configuration featuring two host medium/waveguide configurations similar to those depicted in FIG. 9, wherein the two host mediums are configured to move independently.
Figure 13:
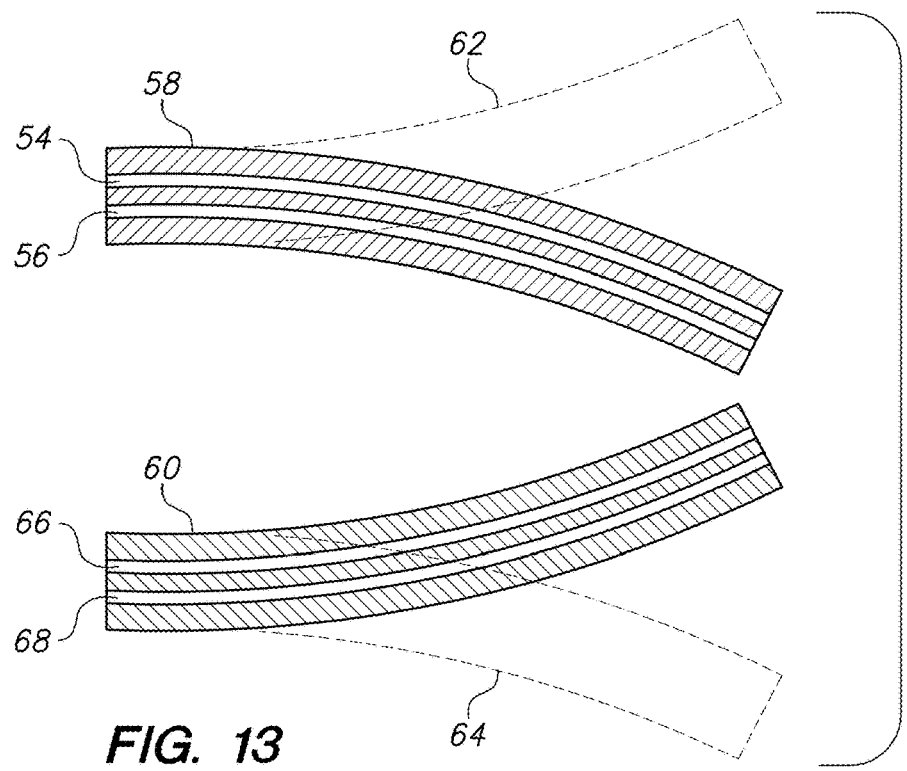
FIG. 13 illustrates movement of a configuration featuring two host medium/waveguide configurations similar to those depicted in FIG. 8, wherein the two host mediums are configured to move independently.

Referring to FIG. 8, an embodiment is depicted wherein two or more waveguides (54, 56) are coupled to, or co-located within, the same host medium (58). FIG. 9 illustrates an embodiment wherein each of two waveguides (54, 56) are coupled to their own independent host medium (58, 60). Referring to FIG. 10, when a configuration such as that illustrated in FIG. 8 is controllably moved (illustrated as a dashed counterposition 62), such as by a piezoelectric actuation element as described above in reference to FSD systems, both waveguides (54, 56) move, or scan, together. Referring to FIG. 11, when two configurations such as that depicted in FIG. 9 are operatively coupled to each other, such as by a common housing or coupling member, they move, or scan, together (movement illustrated as dashed counterpositions 62, 64). Alternatively, referring to FIG. 12, independently actuated (such as by piezoelectric actuation elements) host medium platforms (58, 60) may independently move their intercoupled waveguides (54, 56), as shown in FIG. 12 with the waveguides moving (62, 64) in opposite directions at the time of the illustration. FIG. 13 illustrates a configuration analogous to that of FIG. 12, with the exception that each of the independently actuated host medium/waveguide constructs of FIG. 13 contains more than one waveguides per medium (e.g., a multi-core optical fiber) such that different waveguides within a given host medium (58, for example) move together, while they may move completely independently relative to the waveguides coupled to the other host medium (60).

Figure 14:
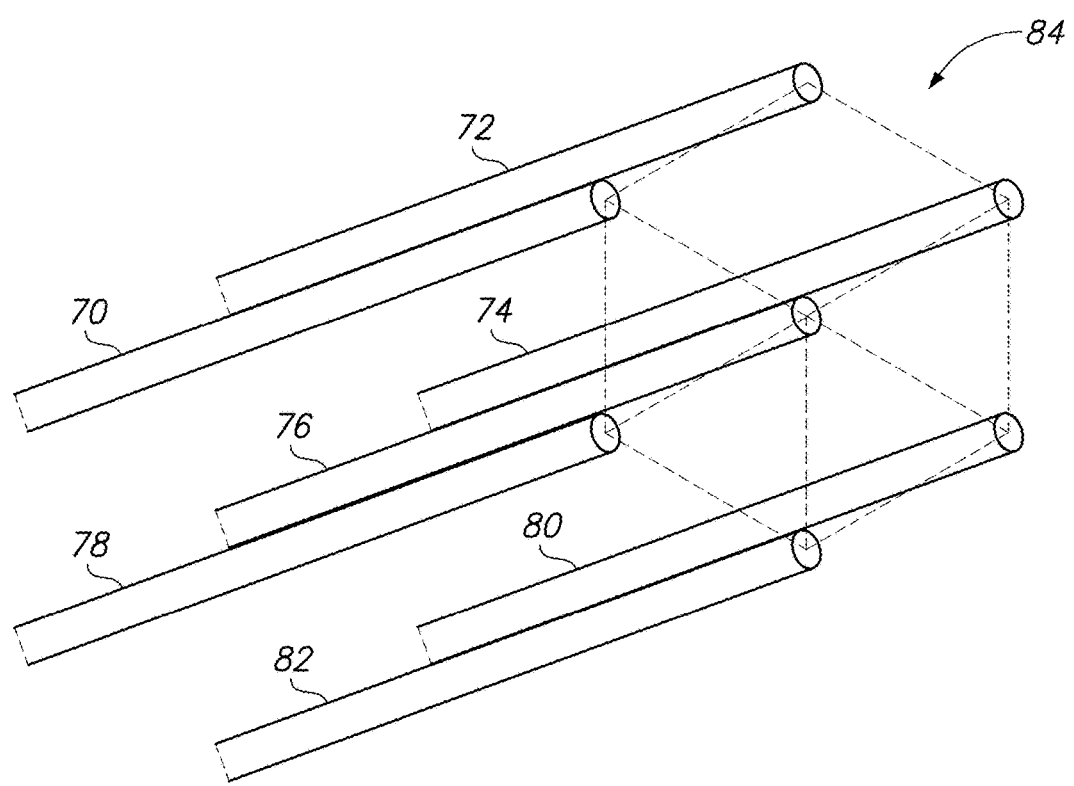
FIG. 14 illustrates a hexagonal packed multicore waveguide configuration.
Figure 15A:
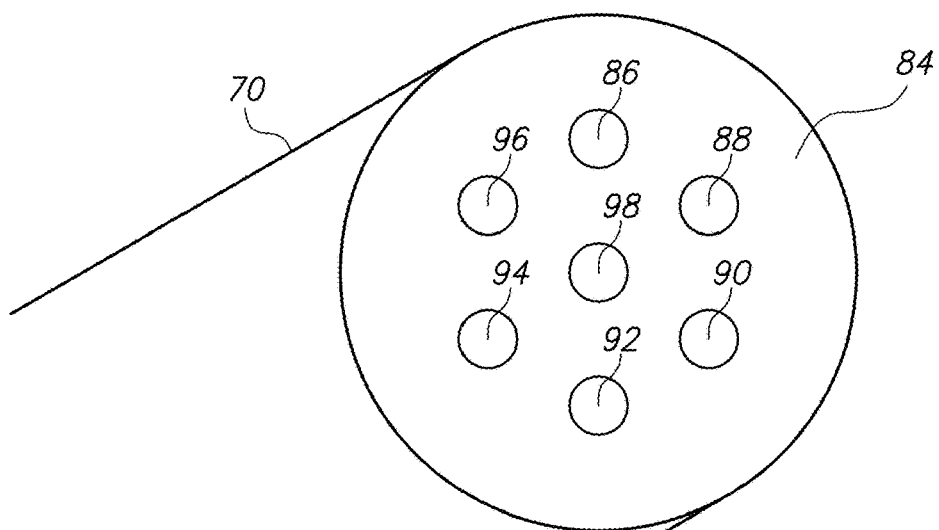
FIGS. 15A and 15B illustrate multicore waveguide configurations wherein individual cores are hexagonal packed within the multicore construct.
Figure 15B:
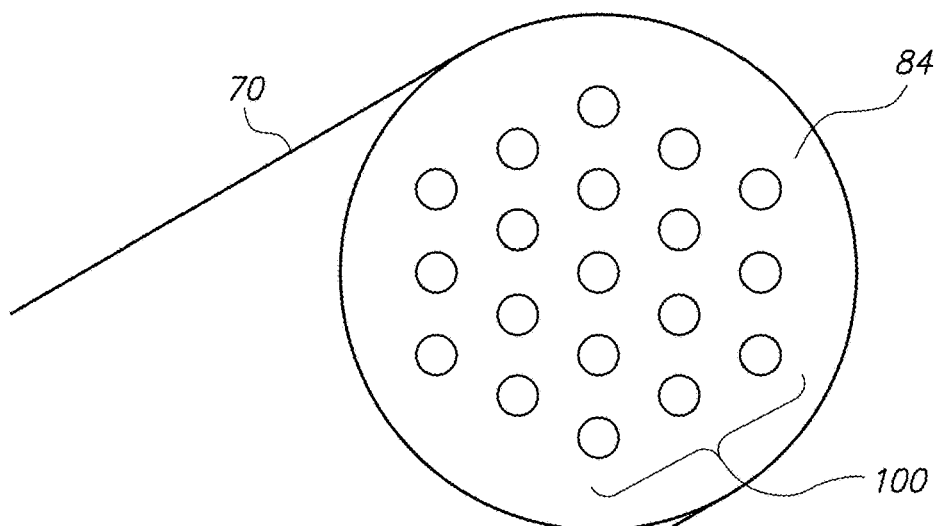

Referring to FIG. 14, a hexagonal-packed (84) configuration of multicore waveguides (70, 72, 74, 76, 78, 80, 82) is illustrated. As described above hexagonal packing may be preferred for high cross sectional density. Referring to FIGS. 15A and 15B, the individual cores (86, 88, 90, 92, 94, 96, 98) within a multicore fiber configuration (70) may also be hexagonally packed (78). The configuration of FIG. 15A shows a group of seven individual cores packed in a hexagonal (84) configuration; the configuration illustrates that any number of individual cores, such as the depicted plurality (100), may be hexagonally packed (84) for desired cross sectional density.

Figure 16A:
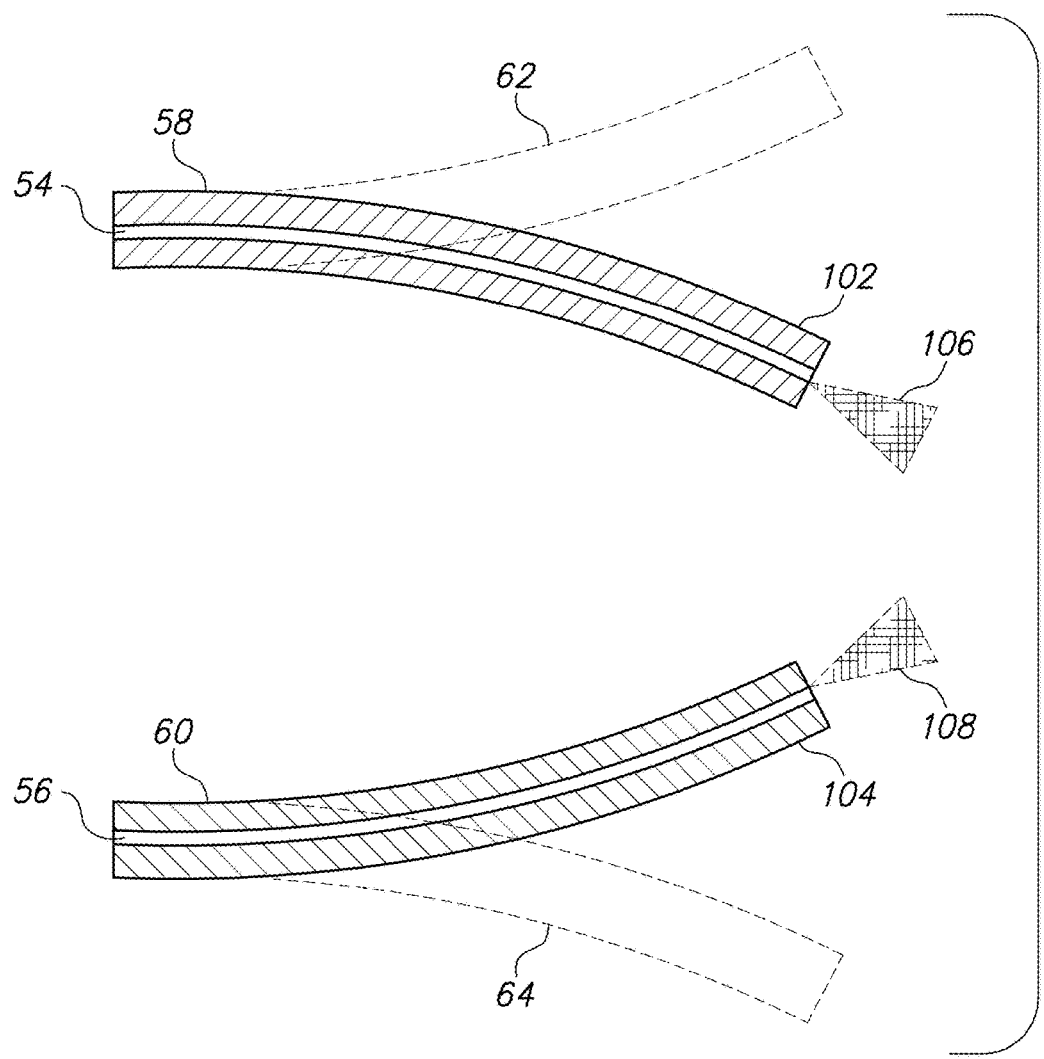
FIG. 16A illustrates a configuration similar to that of FIG. 12, with emissions being output from the distal ends of the waveguides.
Figure 16B:
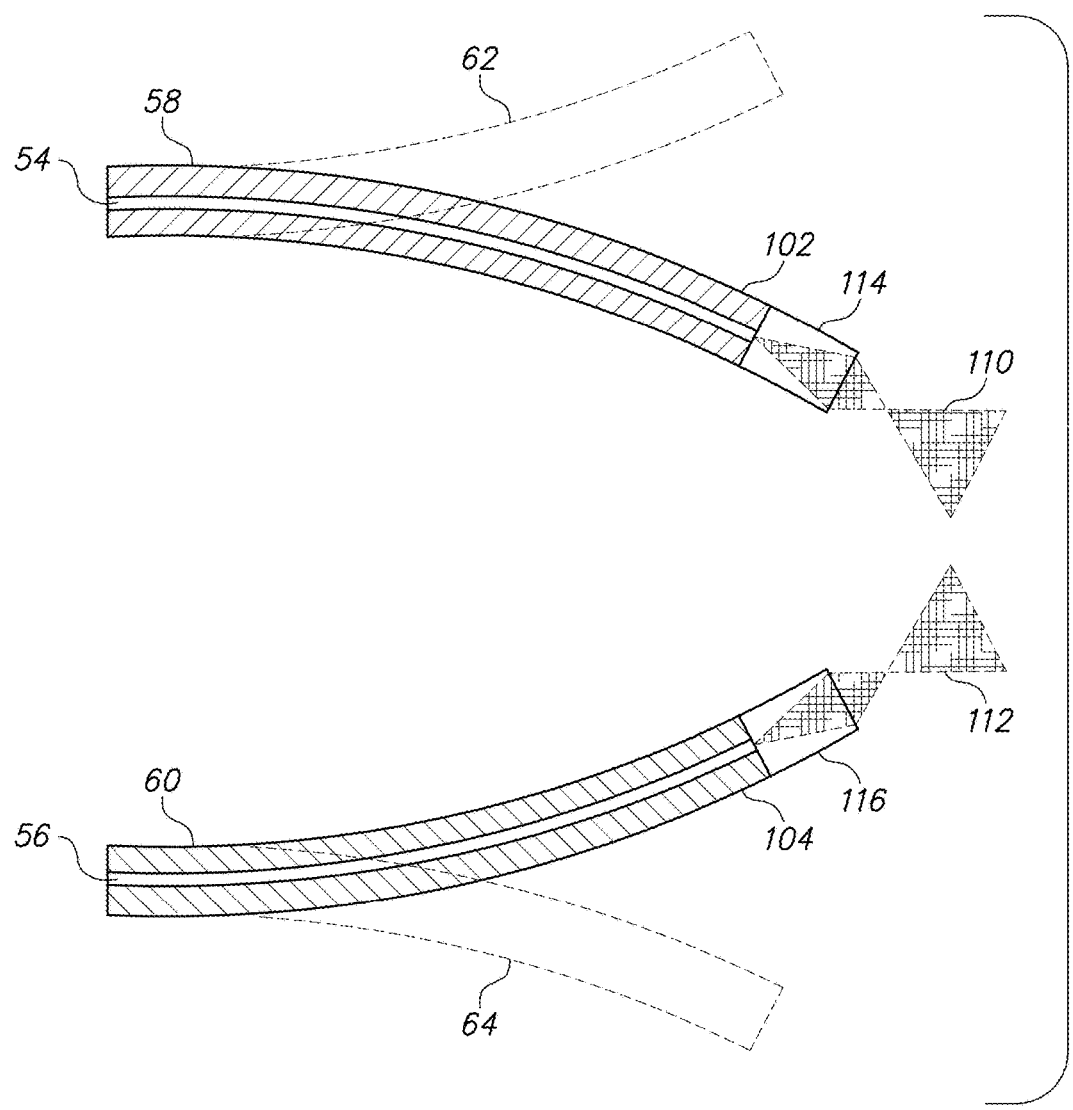
FIG. 16B illustrates a configuration similar to that of FIG. 16A, with the exception that emissions being output from the distal ends of the waveguides are passed through intercoupled lenses.

Referring to FIG. 16A, a configuration similar to that of FIG. 12 is depicted with emissions (106, 108) coming out of the output ends (102, 104) of the waveguides (54, 56) with relatively low emission numerical aperture configurations. To optimize possible display resolution and/or increase the size of an eyebox provided to a viewer, the numerical apertures may be increased by using lenses; in one embodiment, as illustrated in FIG. 16B, lenses (114, 116), such as GRIN lenses (as described above), may be utilized to increase numerical apertures of the output emissions (110, 112).

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed:

1. A system for scanning electromagnetic imaging radiation, comprising:
   a drive electronics system configured to generate at least one pixel modulation signal;
   at least one electromagnetic radiation source configured to modulate light from the at least one electromagnetic radiation source based on the at least one pixel modulation signal;
   a first waveguide configured to follow a first scan pattern and produce a first projected field area;
   a second waveguide configured to follow a second scan pattern and produce a second projected field area;
   a scanning actuator operatively coupled to and configured to physically displace the first and second waveguide along with at least one other intercoupled waveguide,
   wherein each of the first waveguide and the second waveguide is operatively coupled to the at least one electromagnetic radiation source, and
   wherein the drive electronics system is configured to luminance modulate at least one of the first waveguide or second waveguide concurrent with the first projected field area overlapping with the second projected field area.

2. A system for scanning electromagnetic imaging radiation, comprising:
   a drive electronics system configured to generate at least one pixel modulation signal;
   at least one electromagnetic radiation source configured to modulate light from the at least one electromagnetic radiation source based on the at least one pixel modulation signal;
   a first waveguide configured to follow a first scan pattern and produce a first projected field area;
   a second waveguide configured to follow a second scan pattern and produce a second projected field area;
   a scanning actuator operatively coupled to and configured to physically displace the first and second waveguide, the second waveguide being intercoupled with the first waveguide,
   wherein each of the first waveguide and the second waveguide is operatively coupled to the at least one electromagnetic radiation source, and
   wherein the drive electronics system is configured to luminance modulate at least one of the first waveguide or second waveguide concurrent with the first projected field area overlapping with the second projected field area.

3. The system according to any one of claims 1-2, wherein at least of the one of the first or second waveguides comprises an optical fiber.

4. The system according to any one of claims 1-2, wherein the optical fiber comprises a cladding and at least one core.

5. The system of claim 3, wherein the optical fiber comprises two or more cores occupying the same cladding.

* * * * *